US012631921B2

(12) United States Patent
Kimura et al.

(10) Patent No.: US 12,631,921 B2
(45) Date of Patent: May 19, 2026

(54) DISPLAY DEVICE AND DISPLAY SYSTEM

(71) Applicant: Magnolia White Corporation, Tokyo (JP)

(72) Inventors: Shunichi Kimura, Tokyo (JP);
Toshiharu Matsushima, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 0 days.

(21) Appl. No.: 18/918,238

(22) Filed: Oct. 17, 2024

(65) Prior Publication Data

US 2025/0130463 A1     Apr. 24, 2025

(30) Foreign Application Priority Data

Oct. 19, 2023   (JP) ................................. 2023-180585

(51) Int. Cl.
*G02F 1/1343*     (2006.01)
*G02F 1/1362*     (2006.01)
*G02F 1/1368*     (2006.01)
(52) U.S. Cl.
CPC .. *G02F 1/134381* (2021.01); *G02F 1/136286* (2013.01); *G02F 1/1368* (2013.01)
(58) Field of Classification Search
CPC ......... G02F 1/134381; G02F 1/136286; G02F 1/1368
See application file for complete search history.

(56) References Cited

U.S. PATENT DOCUMENTS

| | | | |
|---|---|---|---|
| 2014/0292732 A1 * | 10/2014 | Niioka ................. | G09G 3/3648 |
| | | | 345/204 |
| 2014/0354931 A1 | 12/2014 | Kurasawa et al. | |
| 2017/0277005 A1 | 9/2017 | Kurasawa et al. | |
| 2018/0196319 A1 | 7/2018 | Kurasawa et al. | |
| 2019/0072827 A1 * | 3/2019 | Kurasawa ......... | G02F 1/134363 |
| 2019/0171069 A1 * | 6/2019 | Jeong ............... | G02F 1/134309 |
| 2019/0187522 A1 | 6/2019 | Katayama et al. | |

FOREIGN PATENT DOCUMENTS

| | | |
|---|---|---|
| JP | 2014232136 A | 12/2014 |
| JP | 2019113584 A | 7/2019 |

* cited by examiner

*Primary Examiner* — Lucy P Chien
(74) *Attorney, Agent, or Firm* — Maier & Maier, PLLC

(57) ABSTRACT

According to an aspect, a display device includes an array substrate, a counter substrate, and a liquid crystal layer including liquid crystal molecules. The array substrate includes signal lines arrayed in a first direction, scanning lines arrayed in a second direction, pixel electrodes disposed respectively in openings of pixels, semiconductors provided respectively to the pixels, and a common electrode overlapping the pixel electrodes with an insulating film interposed therebetween. An end of each pixel electrode overlaps the opening of a corresponding one of the pixels. A slit of the common electrode has a polygonal shape. In the opening of each pixel, a first part of the slit overlaps the pixel electrode, and a second part of the slit overlaps a region not provided with the pixel electrode.

5 Claims, 14 Drawing Sheets

FIG.14

DISPLAY DEVICE AND DISPLAY SYSTEM

CROSS-REFERENCE TO RELATED APPLICATION

This application claims the benefit of priority from Japanese Patent Application No. 2023-180585 filed on Oct. 19, 2023, the entire contents of which are incorporated herein by reference.

BACKGROUND

1. Technical Field

What is disclosed herein relates to a display device and a display system.

2. Description of the Related Art

Japanese Patent Application Laid-open Publication No. 2014-232136 (JP-A-2014-232136) and Japanese Patent Application Laid-open Publication No. 2019-113584 (JP-A-2019-113584) disclose display devices that achieve higher response speed and higher transmittance.

In JP-A-2014-232136, if the pixels are made finer for higher definition, it is difficult to form the comb-teeth-shaped portions of electrodes. In JP-A-2019-113584, four liquid crystal domains of the same size are generated around two openings (slits), thereby improving the response speed. In JP-A-2019-113584, however, if the pixels are made finer for higher definition, all the four liquid crystal domains around the two openings (slits) become equally small, and the transmittance may possibly be reduced.

For the foregoing reasons, there is a need for a display device and a display system that achieve higher transmittance if pixels are made finer for higher definition.

SUMMARY

According to an aspect, a display device includes: an array substrate; a counter substrate facing the array substrate; and a liquid crystal layer including liquid crystal molecules between the array substrate and the counter substrate. The array substrate includes: a plurality of signal lines arrayed in a first direction so as to be spaced apart from each other; a scanning lines arrayed in a second direction so as to be spaced apart from each other; a plurality of pixel electrodes disposed respectively in openings of pixels each of which is surrounded by two adjacent signal lines and two adjacent scanning lines; a plurality of semiconductors provided respectively to the pixels; and a common electrode overlapping the pixel electrodes with an insulating film interposed between the common electrode and the pixel electrodes. An end of each of the pixel electrodes overlaps the opening of a corresponding one of the pixels. A slit of the common electrode has a polygonal shape. In the opening of each of the pixels, a first part of the slit of the common electrode overlaps the pixel electrode, and a second part of the slit of the common electrode overlaps a region not provided with the pixel electrode.

According to an aspect, a display system includes: a lens; the display device; and a control device configured to output an image to the display device.

BRIEF DESCRIPTION OF THE DRAWINGS

FIG. 14 is a sectional view schematically illustrating the section along line IX-IX' of FIG. 8 according to the second embodiment.

DETAILED DESCRIPTION

Figure 1:
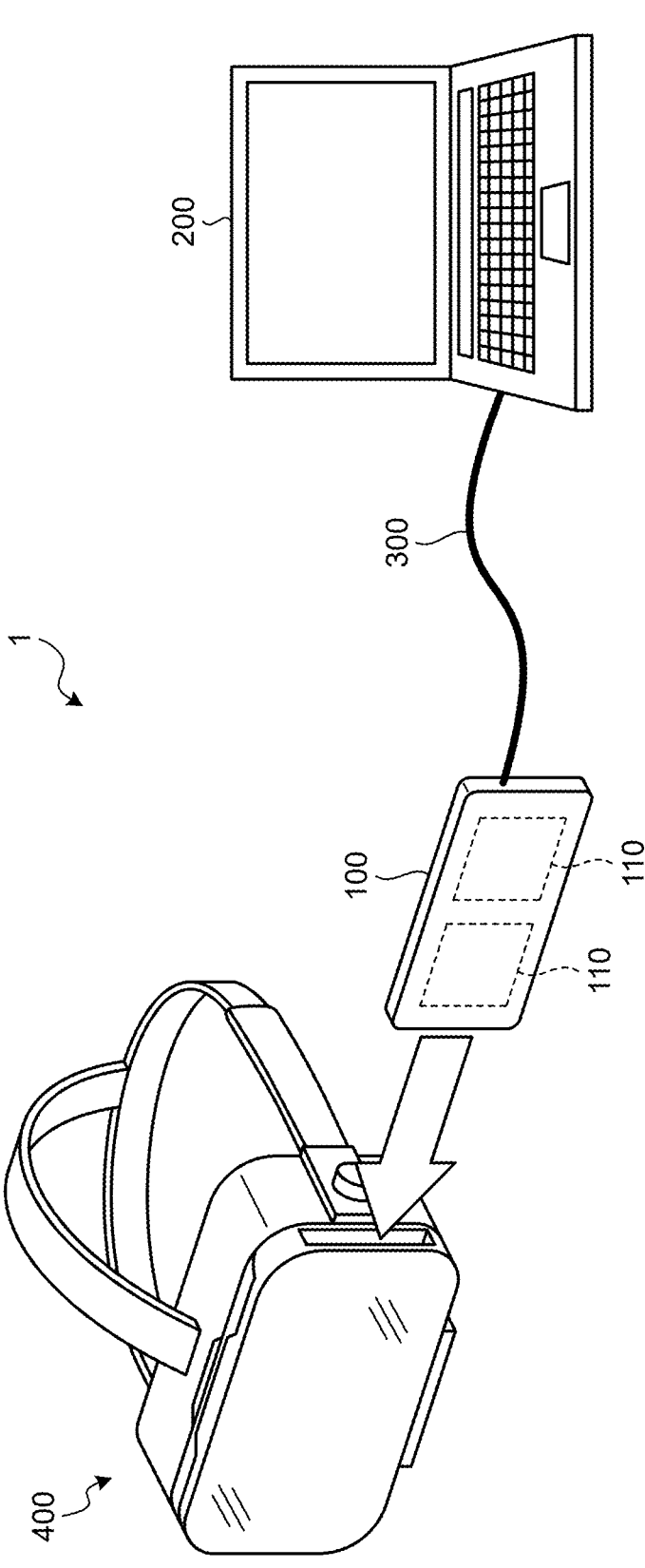
FIG. 1 is a configuration diagram of an example of a display system according to a first embodiment.

Exemplary aspects (embodiments) to embody the present invention are described below in greater detail with reference to the accompanying drawings. The contents described in the embodiments below are not intended to limit the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the invention and easily conceivable by those skilled in the art naturally fall within the scope of the present disclosure. To simplify the explanation, the drawings may possibly illustrate the width, the thickness, the shape, and other elements of each unit more schematically than the actual aspect. These elements, however, are given by way of example only and are not intended to limit interpretation of the present disclosure. In the present specification and the figures, components similar to those previously described with reference to previous figures are denoted by the same reference numerals, and detailed explanation thereof may be appropriately omitted.

In this disclosure, when an element is described as being "on" another element, the element can be directly on the other element, or there can be one or more elements between the element and the other element.

First Embodiment

Figure 2:
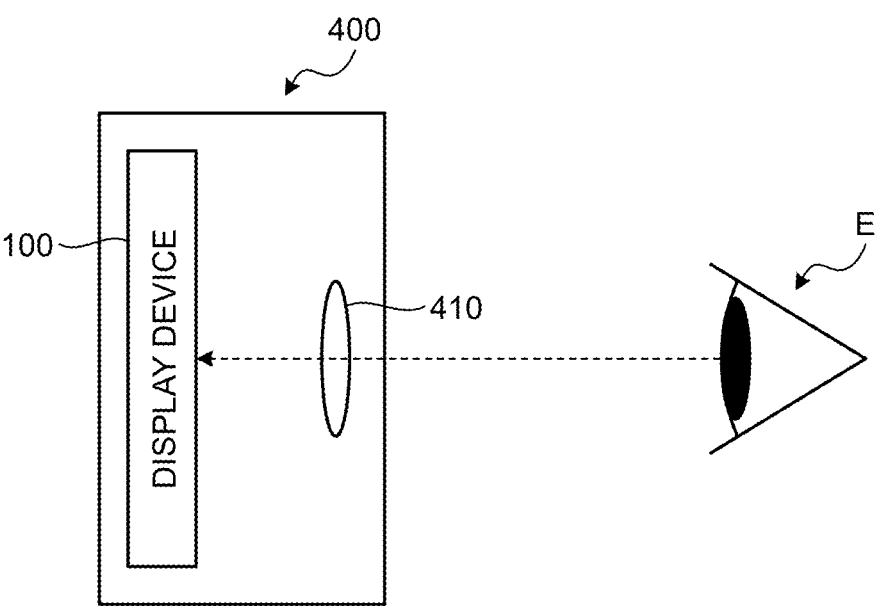
FIG. 2 is a schematic diagram of an example of the relative relation between a display device and the eyes of a user.

FIG. 1 is a configuration diagram of an example of a display system according to a first embodiment. FIG. 2 is a schematic diagram of an example of the relative relation between a display device and the eyes of a user.

A display system 1 according to the present embodiment is a display system that changes images in synchronization with movement of the user. The display system 1 is, for example, a virtual reality (VR) system that three-dimensionally displays VR images of three-dimensional objects or the like in a virtual space and changes the three-dimensional images depending on changes of the orientation (position) of the user's head, thereby providing a sense of virtual reality to the user.

The display system 1 includes a display device 100 and a control device 200, for example. The display device 100 and the control device 200 can receive and transmit information (signals) via a cable 300. Examples of the cable 300 include, but are not limited to, a universal serial bus (USB) cable, a high-definition multimedia interface (HDMI) (registered trademark) cable, etc. The display device 100 and the control device 200 may be capable of receiving and transmitting information through wireless communications.

The display device 100 is supplied with electric power from the control device 200 via the cable 300. The display device 100, for example, may include a power receiver supplied with electric power from a power supply of the control device 200 via the cable 300. In this case, display panels 110, a sensor 120, and other components of the display device 100 may be driven using the electric power supplied from the control device 200. This configuration eliminates a battery or the like from the display device 100 and can be provided as a more inexpensive and lighter display device 100. Alternatively, a wearable member 400 or the display device 100 may be provided with a battery to supply electric power to the display device.

The display device 100 includes display panels. The display panel is a liquid crystal display, for example.

The display device 100 is fixed to the wearable member 400. Examples of the wearable member 400 include, but are not limited to, a headset, goggles, a helmet and a mask that cover both eyes of the user, etc. The wearable member 400 is worn on the user's head. When the wearable member 400 is worn, it is positioned in front of the user so as to cover both eyes of the user. The wearable member 400 functions as an immersive wearable member when the display device 100 fixed inside the wearable member 400 is positioned in front of both eyes of the user. The wearable member 400 may include an output part that outputs sound signals or the like output from the control device 200. The wearable member 400 may include the functions of the control device 200.

While the display device 100 in the example illustrated in FIG. 1 is configured to be slotted into the wearable member 400, it may be fixed to the wearable member 400. In other words, the display system may be composed of a wearable display device including the wearable member 400 and the display device 100, and the control device 200.

As illustrated in FIG. 2, the wearable member 400 includes a lens 410 corresponding to both eyes of the user, for example. The lens 410 is a magnifying lens to form an image in the eyes of the user. When the wearable member 400 is worn on the user's head, the lens 410 is positioned in front of user's eyes E. The user visually recognizes a display region of the display device 100 magnified by the lens 410. Therefore, the display device 100 needs to increase the resolution to clearly display an image (screen). While the configuration according to the present disclosure includes one lens, for example, it may include a plurality of lenses, and the display device 100 may be positioned at a position other than in front of the eyes.

The control device 200, for example, displays images on the display device 100. The control device 200 may be an electronic apparatus, such as a personal computer and a gaming device. Examples of the virtual images include, but are not limited to, computer graphic video images, 360-degree real video images, etc. The control device 200 outputs, to the display device 100, a three-dimensional image generated using the parallax of both eyes of the user. The control device 200 outputs, to the display device 100, images for the right eye and the left eye that follow the changes of the orientation of the user's head.

Figure 3:
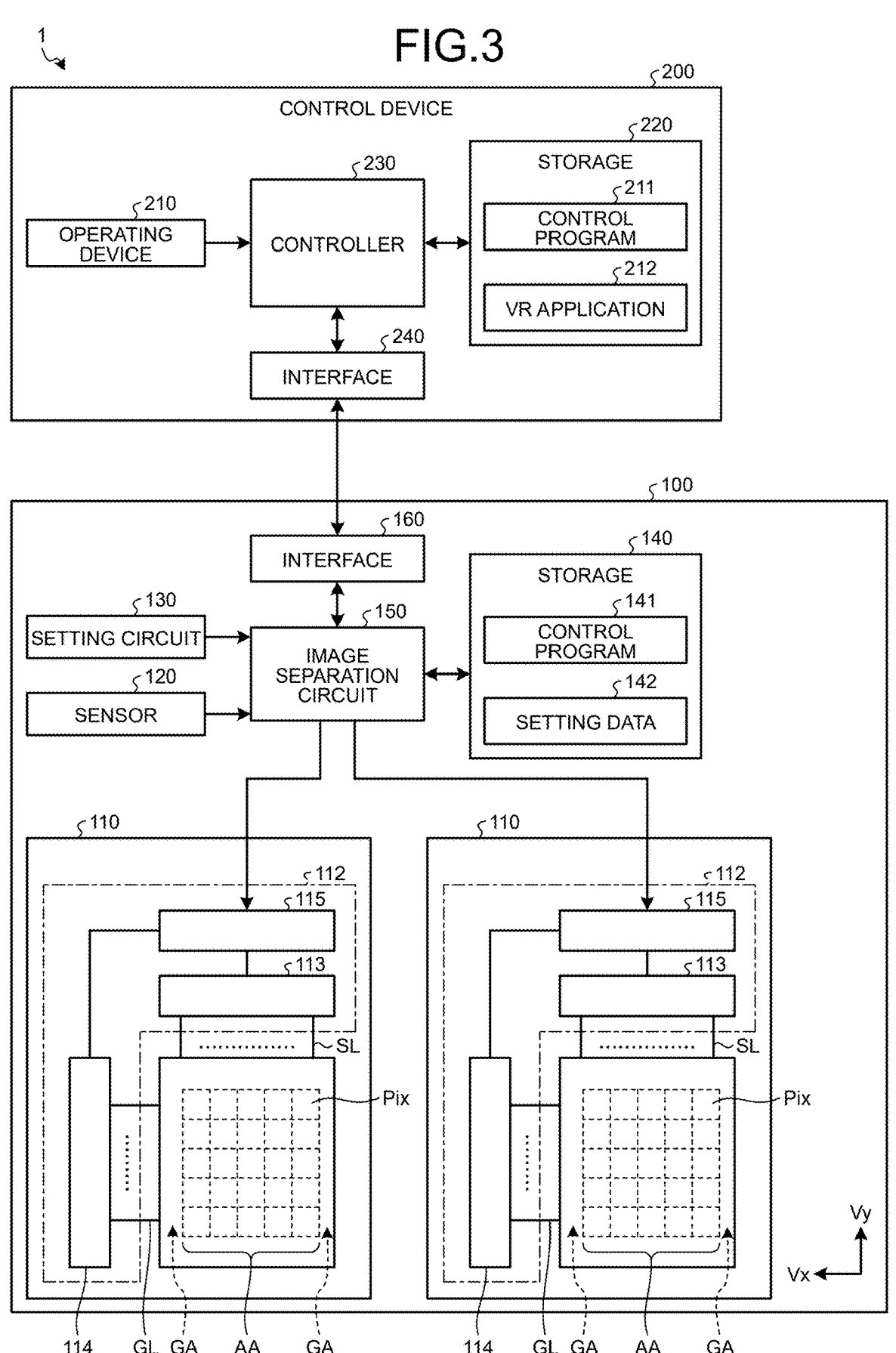
FIG. 3 is a block diagram of an example of the configuration of the display system according to the first embodiment.

FIG. 3 is a block diagram of an example of the configuration of the display system according to the first embodiment. As illustrated in FIG. 3, the display device 100 includes two display panels 110, a sensor 120, an image separation circuit 150, and an interface 160.

The display device 100 is composed of two display panels 110: one is used as the display panel 110 for the left eye, and the other is used as the display panel 110 for the right eye.

The two display panels 110 each have a display region AA and a display control circuit 112. The display panel 110 is provided with a light source device, not illustrated, that irradiates the display region AA with light from behind the display panel 110.

In the display region AA, $P_0 \times Q_0$ pixels Pix ($P_0$ pixels Pix in the row direction and $Q_0$ pixels Pix in the column direction) are arrayed in a two-dimensional matrix (row-column configuration). In the present embodiment, $P_0$ is 2880, and $Q_0$ is 1700. FIG. 3 schematically illustrates the array of the pixels Pix, and the array of the pixels Pix will be described later in greater detail. The pixels of the display device are visually recognized through the lens. For this reason, the pixel pitch is 3 μm to 10 μm, for example, and the display region AA is composed of a high-definition array of the pixels Pix. The display region AA is surrounded by a peripheral region GA.

The display panel 110 includes scanning lines extending in a direction Vx and signal lines extending in a direction Vy that intersects the direction Vx. The display panel 110 includes 2880 signal lines SL and 1700 scanning lines GL, for example. In the display panel 110, the region surrounded by the signal lines SL and the scanning lines GL is provided with the pixel Pix. The pixel Pix includes a switching element SW (thin-film transistor (TFT)) coupled to the signal line SL and the scanning line GL, and a pixel electrode coupled to the switching element SW. One scanning line GL is coupled to a plurality of pixels Pix arranged along the extending direction of the scanning line GL. One signal line SL is coupled to a plurality of pixels Pix arranged along the extending direction of the signal line SL.

The display region AA of one display panel 110 of the two display panels 110 is for the right eye, and the display region AA of the other display panel 110 is for the left eye. The first embodiment describes a case where the display panel 110 includes the two display panels 110 for the left eye and the right eye. The display device 100, however, does not necessarily include two display panels 110 as described above. The display device 100, for example, may include one display panel 110. In this case, the display region of the display panel 110 may be divided into two parts such that the right half region displays images for the right eye and the left half region displays images for the left eye.

The display control circuit 112 includes a driver integrated circuit (IC) 115, a signal line coupling circuit 113, and a scanning line drive circuit 114. The signal line coupling circuit 113 is electrically coupled to the signal lines SL. The driver IC 115 causes the scanning line drive circuit 114 to control ON/OFF of the switching elements (e.g., TFT) for controlling the operation (light transmittance) of the pixels Pix. The scanning line drive circuit 114 is electrically coupled to the scanning lines GL.

The sensor 120 detects information that enables determination of the orientation of the user's head. The sensor 120, for example, detects information indicating the movement of the display device 100 and/or the wearable member 400, and the display system 1 determines the orientation of the head of the user wearing the display device 100 on the head based on the information indicating the movement of the display device 100 and/or the wearable member 400.

The sensor 120 detects the information that enables determination of the direction of the line of sight using at least one of the angle, acceleration, angular velocity, azimuth, and distance of the display device 100 and/or the wearable member 400, for example. Examples of the sensor 120 include, but are not limited to, a gyro sensor, an acceleration sensor, an azimuth sensor, etc. The sensor 120 may detect the angle and angular velocity of the display device 100 and/or the wearable member 400 by a gyro sensor, for example. The sensor 120 may detect the direction and magnitude of acceleration acting on the display device 100 and/or the wearable member 400 by an acceleration sensor, for example. The sensor 120 may detect the azimuth of the display device 100 by an azimuth sensor, for example. The sensor 120 may detect the movement of the display device 100 and/or the wearable member 400 by a distance sensor or a global positioning system (GPS) receiver, for example. The sensor 120 may be any other sensor, such as an optical sensor, or a combination of a plurality of sensors, as long as it is a sensor that detects the orientation of the user's head, changes in the line of sight, movement, or the like. The sensor 120 may be electrically coupled to the image separation circuit 150 via the interface 160, which will be described later.

The image separation circuit 150 receives image data for the left eye and image data for the right eye transmitted from the control device 200 via the cable 300. The image separation circuit 150 transmits the image data for the left eye to the display panel 110 that displays images for the left eye and transmits the image data for the right eye to the display panel 110 that displays images for the right eye.

The interface 160 includes a connector to which the cable 300 (FIG. 1) is coupled. The interface 160 receives signals from the control device 200 via the coupled cable 300. The image separation circuit 150 outputs the signals received from the sensor 120 to the control device 200 via the interface 160 and an interface 240. The signals received from the sensor 120 include the information that enables determination of the direction of the line of sight described above. Alternatively, the signals received from the sensor 120 may be output directly to a controller 230 of the control device 200 via the interface 160. The interface 160 may be a wireless communication device, for example, and transmit and receive information to and from the control device 200 through wireless communications.

The control device 200 includes an operating device 210, a storage 220, the controller 230, and the interface 240.

The operating device 210 receives operations of the user. The operating device 210 is an input device, such as a keyboard, buttons, and a touch screen. The operating device 210 is electrically coupled to the controller 230. The operating device 210 outputs information corresponding to the operations to the controller 230.

The storage 220 stores therein computer programs and data. The storage 220 temporarily stores therein the results of processing by the controller 230. The storage 220 includes a storage medium. Examples of the storage medium include, but are not limited to, ROM, RAM, a memory card, an optical disc, a magneto-optical disc, etc. The storage 220 may store therein data of images to be displayed on the display device 100.

The storage 220 stores therein a control program 211 and a VR application 212, for example. The control program 211 can implement functions related to various controls for operating the control device 200, for example. The VR application 212 can implement functions to display virtual reality images on the display device 100. The storage 220, for example, can store therein various kinds of information, such as data indicating the detection results of the sensor 120, received from the display device 100.

Examples of the controller 230 include, but are not limited to, a micro control unit (MCU), a central processing unit (CPU), etc. The controller 230 can collectively control the operations of the control device 200. The various functions of the controller 230 are implemented based on the control by the controller 230.

The controller 230 includes a graphics processing unit (GPU) that generates images to be displayed, for example. The GPU generates images to be displayed on the display device 100. The controller 230 outputs the images generated by the GPU to the display device 100 via the interface 240. While the controller 230 of the control device 200 according to the present embodiment includes a GPU, the present embodiment is not limited thereto. For example, the GPU may be provided in the display device 100 or the image separation circuit 150 of the display device 100. In this case, the display device 100 acquires data from the control device 200 or an external electronic apparatus, for example, and the GPU generates the images based on the data.

The interface 240 includes a connector to which the cable 300 (refer to FIG. 1) is coupled. The interface 240 receives signals from the display device 100 via the cable 300. The interface 240 outputs signals received from the controller 230 to the display device 100 via the cable 300. The interface 240 may be a wireless communication device, for example, and may transmit and receive information to and from the display device 100 through wireless communications.

When the controller 230 executes the VR application 212, it displays images corresponding to the movement of the user (display device 100) on the display device 100. When the controller 230 detects a change in the user (display device 100) while an image is being displayed on the display device 100, the controller 230 changes the image being displayed on the display device 100 to an image in the direction of the change. When starting to generate an image, the controller 230 generates an image based on a reference point of view and a reference line of sight in the virtual space. When the controller 230 detects a change in the user (display device 100), the controller 230 changes the point of view or the line of sight for generating the image to be displayed, from the reference point view or the reference line of sight to the point view or the line of sight corresponding to the movement of the user (display device 100). The controller 230 displays, on the display device 100, an image based on the changed point of view or line of sight.

For example, the controller 230 detects the movement of the user's head to the right direction based on the detection results of the sensor 120. In this case, the controller 230 changes the currently displayed image to an image obtained when the line of sight is moved to the right direction. The user can visually recognize the image on the right side of the image being displayed on the display device 100.

When the controller 230 detects the movement of the display device 100 based on the detection results of the sensor 120, for example, the controller 230 changes the image according to the detected movement. If the controller 230 detects that the display device 100 has moved forward, the controller 230 changes the currently displayed image to an image to be displayed when the display device 100 moves forward. If the controller 230 detects that the display device 100 has moved backward, the controller 230 changes the currently displayed image to an image to be displayed when the display device 100 moves backward. The user can visually recognize the image corresponding to the direction of his/her movement from the image being displayed on the display device 100.

Figure 4:
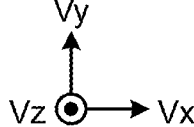
FIG. 4 is a circuit diagram of a pixel array in a display region according to the first embodiment.
Figure 5:
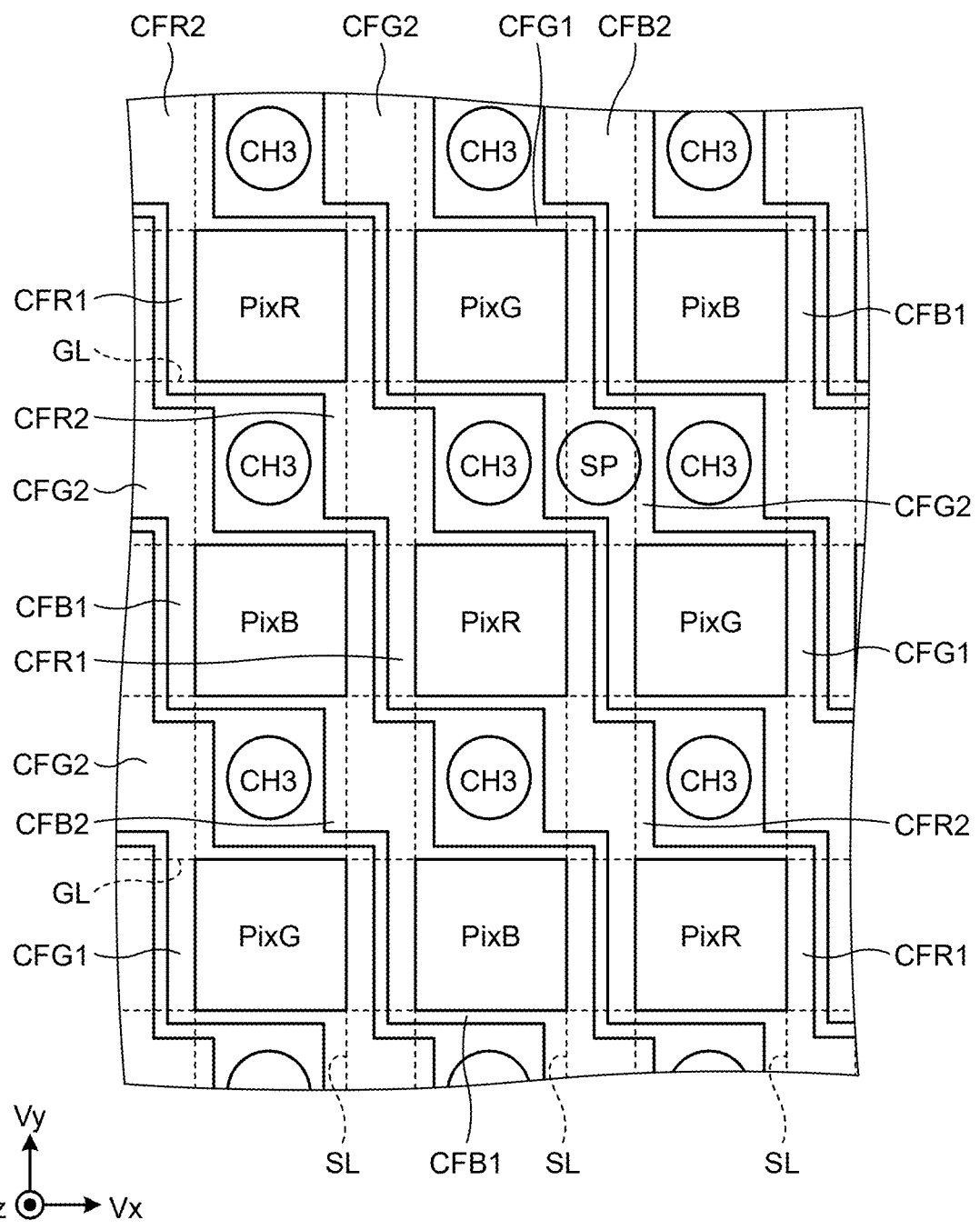
FIG. 5 is a schematic diagram of an example of a display panel according to the first embodiment.

FIG. 4 is a circuit diagram of the pixel array in the display region according to the first embodiment. FIG. 5 is a schematic diagram of an example of the display panel according to the first embodiment. In the present disclosure, the scanning lines GL and the signal lines SL do not necessarily intersect at right angles, but they intersect at right angles in FIG. 4 for the convenience of explanation.

The display region AA is provided with the switching elements SW of pixels PixR, PixG, and PixB, the signal lines SL, the scanning lines GL, and other components as illustrated in FIG. 4. The signal lines SL are wiring for supplying pixel signals to pixel electrodes PE (refer to FIG. 6). The scanning lines GL are wiring for supplying gate signals that drive the switching elements SW.

As illustrated in FIG. 4, the pixels PixR, PixG, and PixB each include the switching element SW and capacitance of a liquid crystal layer LC. The switching element SW is composed of a thin-film transistor and is composed of an n-channel metal oxide semiconductor (MOS) TFT in this example. An insulating film is provided between the pixel electrode PE and a common electrode CE, which will be described later, and a holding capacitor Cs illustrated in FIG. 4 is formed between the pixel electrode PE and the common electrode CE.

In color filters CFR1, CFG1, and CFB1 illustrated in FIG. 5, color regions colored in three colors of red (first color: R), green (second color: G), and blue (third color: B), for example, are periodically arrayed. The three color regions, R, G, and B correspond to the pixels PixR, PixG, and PixB illustrated in FIG. 4 described above. A set of the pixels PixR, PixG, and PixB corresponding to the three color regions serves as a pixel. The color filter may include four or more color regions. The pixels PixR, PixG, and PixB may be referred to as sub-pixels.

The color filters CFR1, CFG1, and CFB1 illustrated in FIG. 5 are each provided at the opening surrounded by two signal lines SL and two scanning lines GL.

As illustrated in FIGS. 4 and 5, the pixel PixR is sandwiched between the pixel PixB and the pixel PixG in the direction Vx (first direction) and between the pixel PixB and the pixel PixG in the direction Vy (second direction).

The pixel PixG is sandwiched between the pixel PixR and the pixel PixB in the direction Vx and between the pixel PixR and the pixel PixB in the direction Vy.

The pixel PixB is sandwiched between the pixel PixG and the pixel PixR in the direction Vx and between the pixel PixG and the pixel PixR in the direction Vy.

The pixel PixR, the pixel PixG, and the pixel PixB are repeatedly arrayed in this order in the direction Vx. The pixel PixR, the pixel PixB, and the pixel PixG are repeatedly arrayed in this order in the direction Vy. In the arrangement in the direction Vy, the pixel PixR, the pixel PixG, and the pixel PixB may be repeatedly arrayed in this order.

The color filters CFR1 are coupled by a color filter CFR2 in the same red color as the color filters CFR1. By coupling the color filters CFR1 and the color filters CFR2, the color filters in the same color are disposed in an oblique direction intersecting the direction Vx and the direction Vy. Similarly, the color filters CFG1 are coupled by a color filter CFG2 in the same green color as the color filters CFG1, and the color filters CFB1 are coupled by a color filter CFB2 in the same blue color as the color filters CFB1.

The color filter CFR1 and the color filter CFR2 are integrally formed. For the convenience of explanation, the color filter CFR1 and the color filter CFR2 are hereinafter referred to as a color filter CFR when they are not distinguished from each other. Similarly, the color filter CFG1 and the color filter CFG2 are hereinafter referred to as a color filter CFG when they are not distinguished from each other. The color filter CFB1 and the color filter CFB2 are hereinafter referred to as a color filter CFB when they are not distinguished from each other. Furthermore, the color filter CFR, the color filter CFG, and the color filter CFB are referred to as a color filter CF when they are not distinguished from one another.

A spacer SP illustrated in FIG. 5 is a member that regulates the distance between an array substrate SUB1 and a counter substrate SUB2. The material of the spacer SP is acrylic resin, for example. The spacer SP has a cylindrical shape, and the maximum diameter of the spacer SP is illustrated in FIG. 5. The spacer SP does not necessarily have a cylindrical shape and may be formed as a prismatic spacer, for example. While one spacer is illustrated as an example in FIG. 5, a plurality of spacers are disposed in the actual configuration.

Figure 6:
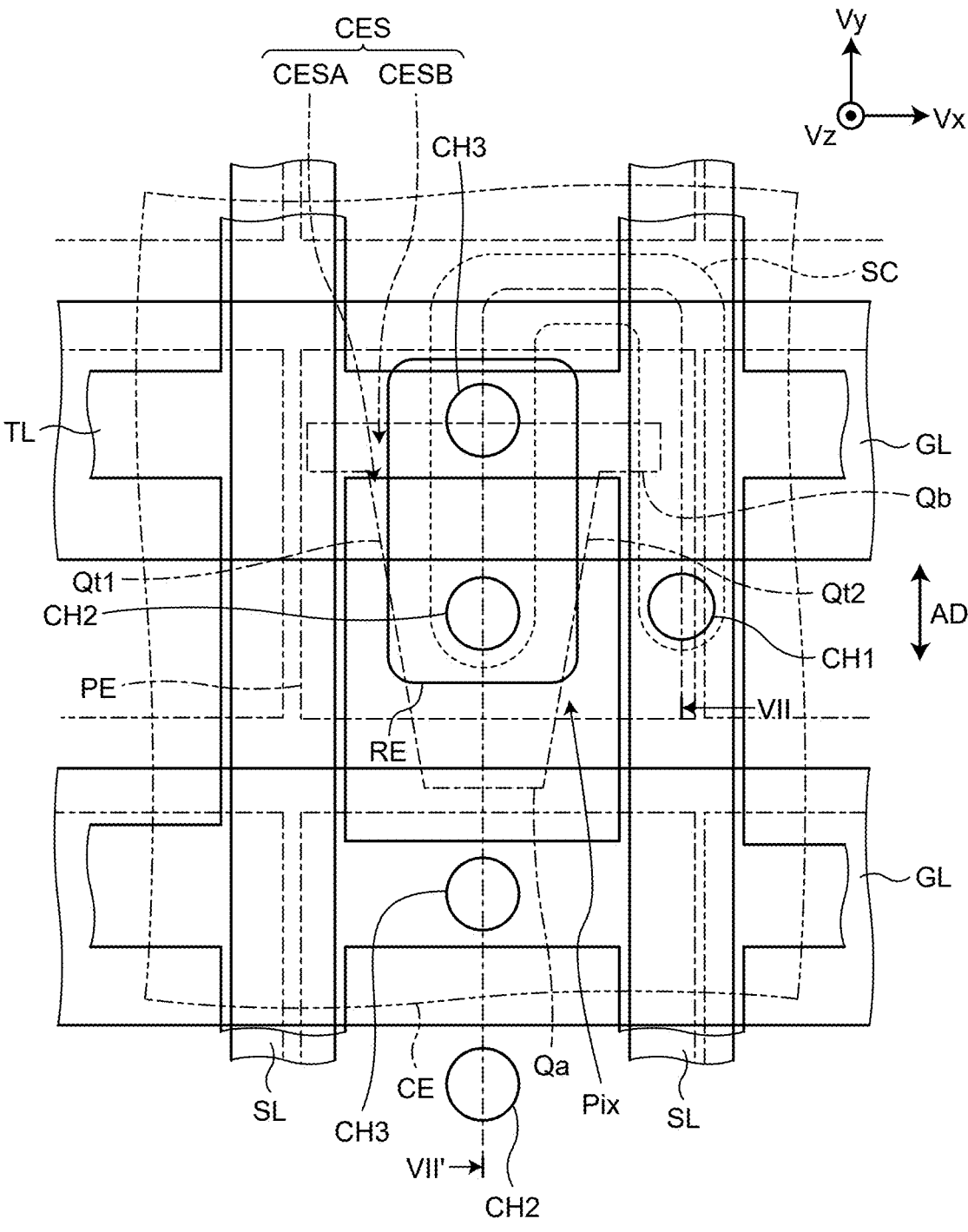
FIG. 6 is an enlarged schematic diagram of part of the display region according to the first embodiment.

FIG. 6 is an enlarged schematic diagram of part of the display region according to the first embodiment. The pixel Pix illustrated in FIG. 6 is any one of the pixel PixR, the pixel PixG, and the pixel PixB. In the following description, the pixel PixR, the pixel PixG, and the pixel PixB are referred to as the pixels Pix when they are not distinguished from one another.

The signal lines SL are arrayed in the direction Vx so as to be spaced apart from each other. The scanning lines GL are arrayed in the direction Vy so as to be spaced apart from each other. A conductive layer TL overlaps the signal lines SL and the scanning lines GL and has a grid shape in plan view. The conductive layer TL has lower resistance than the common electrode CE, thereby reducing variations in voltage distribution in the plane of the common electrode CE due to voltage drop. The width of the conductive layer TL in the direction Vx is larger than that of the signal line SL in the direction Vx. The width of the scanning line GL in the direction Vy is larger than that of the conductive layer TL in the direction Vy. Therefore, the light-transmitting region of the opening of the pixel Pix is the region surrounded by the scanning lines GL and the conductive layer TL.

In the pixel Pix, the pixel electrode PE and the switching element SW are disposed in each opening surrounded by two signal lines SL and two scanning lines GL. The common electrode CE is a common electrode provided across a plurality of pixels Pix. The common electrode CE has a slit CES in each opening surrounded by two signal lines SL and two scanning lines GL.

The slit CES is a part of the common electrode CE not provided with light-transmitting conductive material. The slit CES overlaps the pixel electrode PE. The slit CES has a quadrilateral shape, specifically including a trapezoid shape having a pair of facing sides with different lengths.

As illustrated in FIG. 6, a semiconductor SC is formed in a U-shape. The signal line SL and the semiconductor SC are electrically coupled through a contact hole CH1. The semiconductor SC and a relay electrode RE are electrically coupled through a contact hole CH2. The relay electrode RE and the pixel electrode PE are electrically coupled through a contact hole CH3.

Figure 7:
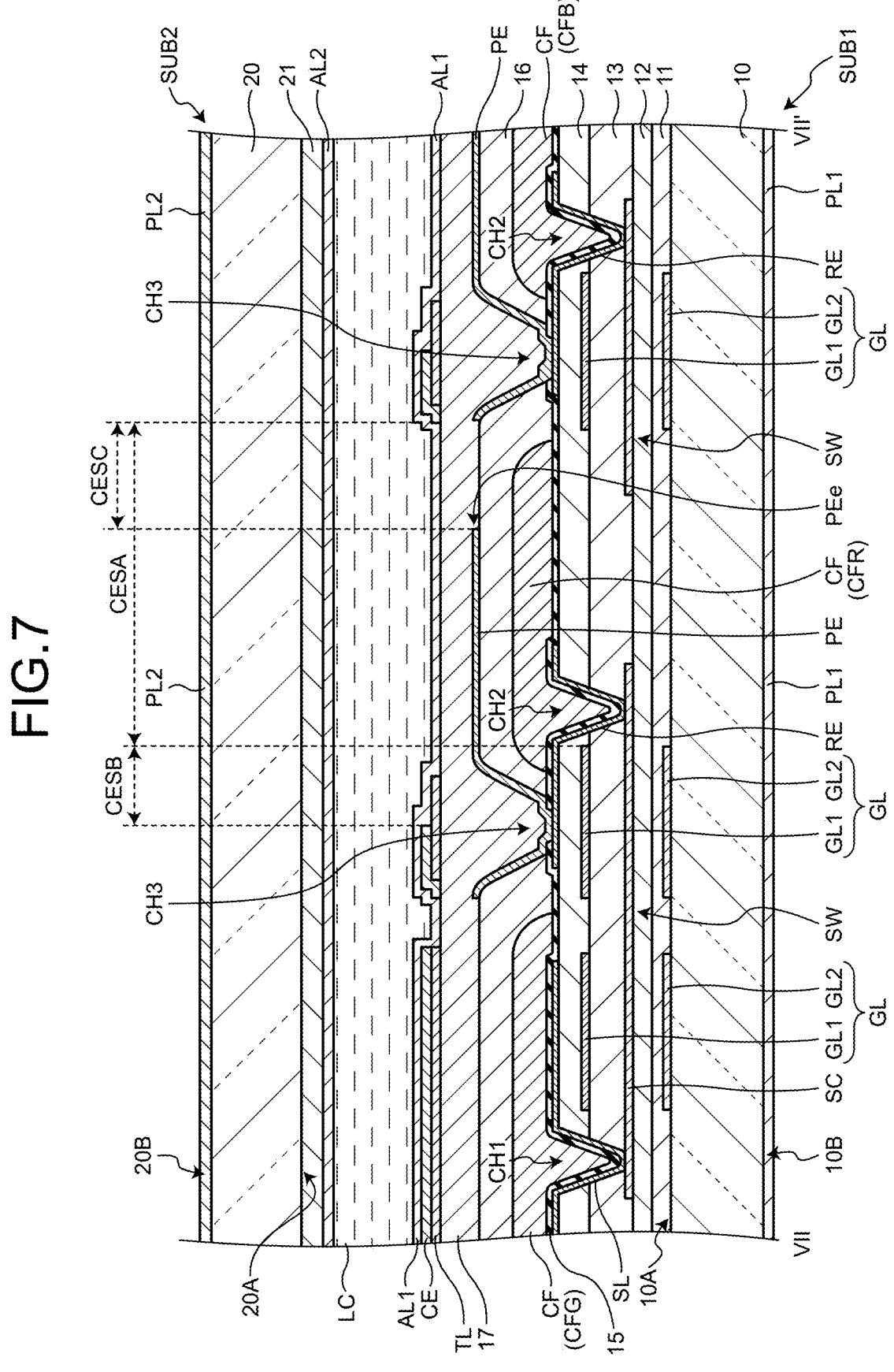
FIG. 7 is a sectional view schematically illustrating the section along line VII-VII' of FIG. 6.

FIG. 7 is a sectional view schematically illustrating the section along line VII-VII' of FIG. 6. As illustrated in FIG. 5, the color filter CF according to the first embodiment is provided to the array substrate SUB1. The display device 100 has what is called a color filter on array (COA) structure in which the color filter CF, the pixel electrodes PE, and the common electrode CE are disposed on the array substrate SUB1.

As illustrated in FIG. 7, the array substrate SUB1 is formed using a first insulating substrate 10 with a light-transmitting property, such as a glass or resin substrate, as a base. The array substrate SUB1 includes a first layer GL1 and a second layer GL2 of the scanning line GL, a first insulating film 11, a second insulating film 12, a third insulating film 13, a fourth insulating film 14, the color filter CF, a fifth insulating film 15, the pixel electrode PE, a sixth insulating film 16, the pixel electrode PE, a seventh insulating film 17, the conductive layer TL, the common electrode CE, a first orientation film AL1, and other components on the surface of the first insulating substrate 10 facing the counter substrate SUB2. In the following description, the direction from the array substrate SUB1 toward the counter substrate SUB2 is referred to as an upper side or simply as above.

The second layer GL2 of the scanning line GL is positioned on the first insulating substrate 10. The first insulating film 11 is positioned on the second layer GL2 of the scanning line GL and an inner surface 10A of the first insulating substrate 10. The second insulating film 12 is positioned on the first insulating film 11. The semiconductor SC is positioned on the second insulating film 12. The third insulating film 13 is positioned on the semiconductor SC and the second insulating film 12. The first layer GL1 of the scanning line GL is positioned on the third insulating film 13. The part of the first layer GL1 and the second layer GL2 of the scanning line GL overlapping the semiconductor SC functions as a gate electrode.

The fourth insulating film 14 is positioned on the first layer GL1 of the scanning line GL and the third insulating film 13. A hole is formed in the third insulating film 13 and the fourth insulating film 14 at a position overlapping the semiconductor SC to form the contact hole CH1. The signal line SL formed on the fourth insulating film 14 is electrically coupled to the semiconductor SC through the contact holes CH1.

A hole is formed in the third insulating film 13 and the fourth insulating film 14 at a position overlapping the semiconductor SC to form the contact hole CH2. The relay electrode RE formed on the fourth insulating film 14 is electrically coupled to the semiconductor SC through the contact holes CH2.

The fifth insulating film 15 is positioned on the signal line SL, the relay electrode RE, and the fourth insulating film 14. The color filter CF is positioned on the fifth insulating film 15. The sixth insulating film 16 is positioned on the color filter CF and the fifth insulating film 15.

A hole is formed in the fifth insulating film 15 and the sixth insulating film 16 at a position overlapping the relay electrode RE to form the contact hole CH3. The pixel electrode PE is electrically coupled to the relay electrode RE through the contact hole CH3. The pixel electrode PE is made of light-transmitting conductive material, such as indium tin oxide (ITO), indium zinc oxide (IZO), and indium gallium oxide (IGO).

The common electrode CE is positioned on the seventh insulating film 17. The common electrode CE is made of light-transmitting conductive material, such as ITO, IZO, and IGO.

The conductive layer TL is positioned on the seventh insulating film 17. The conductive layer TL is a conductor and is electrically coupled to the common electrode CE. Therefore, the resistance per unit area of the common electrode CE and the conductive layer TL is small. The conductive layer TL may be a single layer of metal, such as aluminum (Al). Alternatively, the conductive later TL may be composed of a plurality of metal layers, such as titanium/aluminum/titanium and molybdenum/aluminum/molybdenum, by disposing titanium (Ti) and molybdenum (Mo) on and under aluminum.

The common electrode CE and the slit CES are covered with the first orientation film AL1.

The counter substrate SUB2 is formed using a second insulating substrate 20 as a base. The second insulating substrate 20 is a light-transmitting substrate, such as a glass or resin substrate. The counter substrate SUB2 includes an overcoat layer 21 and a second orientation film AL2 on the surface of the second insulating substrate 20 facing the array substrate SUB1.

The array substrate SUB1 and the counter substrate SUB2 are disposed with the first orientation film AL1 and the second orientation film AL2 facing each other. The liquid crystal layer LC is interposed between the first orientation film AL1 and the second orientation film AL2. The long axis of the liquid crystal molecules is oriented orthogonal or parallel to an initial orientation direction AD illustrated in FIG. 6 by the first orientation film AL1 and the second orientation film AL2. The liquid crystal layer LC is made of negative liquid crystal material with negative dielectric anisotropy or positive liquid crystal material with positive dielectric anisotropy. The orientation of the liquid crystal layer LC is stable when voltage is applied to the liquid crystal layer LC, and the fast response of liquid crystal molecules is easily maintained. If the liquid crystal layer LC is made of positive liquid crystal material, the long axis of the liquid crystal molecules is aligned along a direction parallel to the initial orientation direction AD illustrated in FIG. 6. If the liquid crystal layer LC is made of negative liquid crystal material, the long axis of the liquid crystal molecules is aligned along a direction orthogonal to the initial orientation direction AD illustrated in FIG. 6.

The array substrate SUB1 faces a backlight unit, and the counter substrate SUB2 is positioned on the display surface side. While various kinds of backlight units are applicable, detailed description of their structure is omitted.

A first optical element OD1 including a first polarizing plate PL1 is disposed on an outer surface 10B of the first insulating substrate 10 or the surface facing the backlight unit. A second optical element OD2 including a second polarizing plate PL2 is disposed on an outer surface 20B of the second insulating substrate 20 or the surface on the viewing position side. The first polarization axis of the first polarizing plate PL1 and the second polarization axis of the second polarizing plate PL2 are in a crossed-Nicoles positional relation in the Vx-Vy plane, for example. The first optical element OD1 and the second optical element OD2 may include other optical functional elements, such as a retardation plate.

Figure 8:
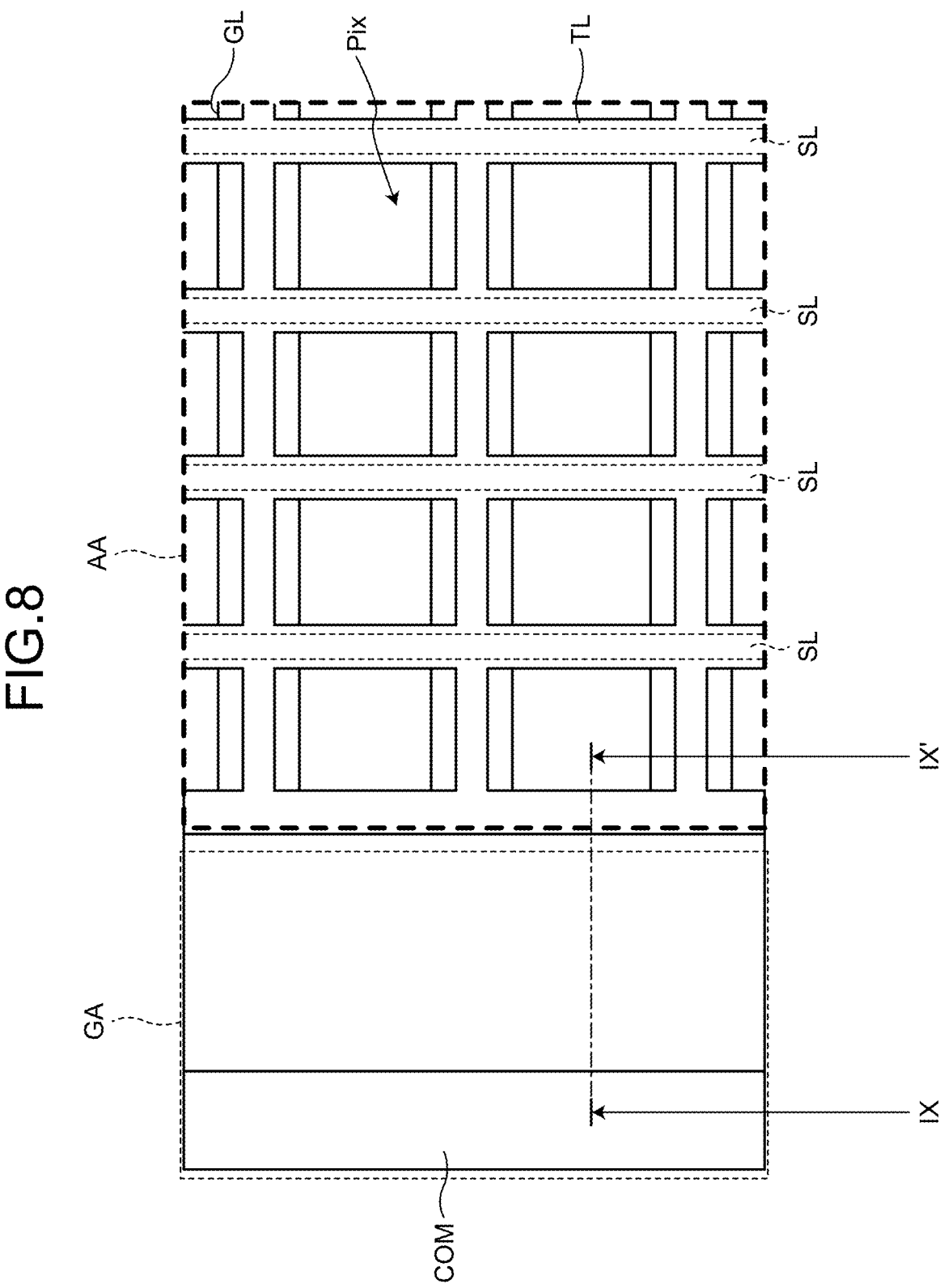
FIG. 8 is a schematic diagram schematically illustrating the boundary between the display region and a peripheral region according to the first embodiment.
Figure 9:
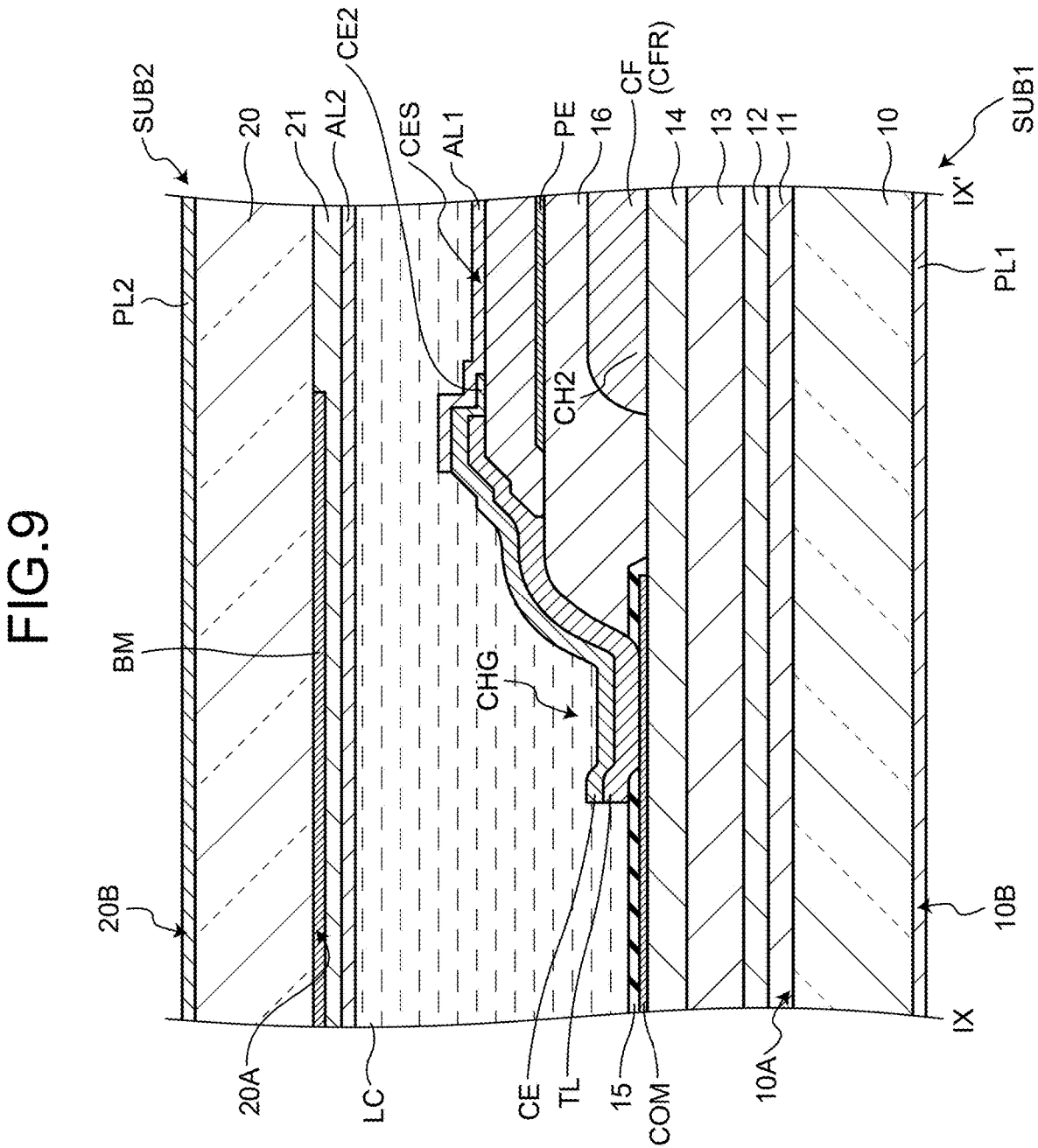
FIG. 9 is a sectional view schematically illustrating the section along line IX-IX' of FIG. 8.

FIG. 8 is a schematic diagram schematically illustrating the boundary between the display region and the peripheral region according to the first embodiment. FIG. 9 is a sectional view schematically illustrating the section along line IX-IX' of FIG. 8.

As illustrated in FIGS. 8 and 9, wiring COM for supplying a common potential is disposed on the fourth insulating film 14 in the peripheral region GA. The fifth insulating film 15 covers and protects the wiring COM. A contact hole CHG is formed in part of the fifth insulating film 15, and the wiring COM is electrically coupled to the conductive layer TL and the common electrode CE extended from the display region AA, through the contact hole CHG.

As illustrated in FIGS. 8 and 9, a light-shielding layer BM is provided to the counter substrate SUB2 in the peripheral region GA and can conceal the peripheral region GA of the array substrate SUB1. As illustrated in FIGS. 7 and 9, the light-shielding layer BM is not provided to the counter substrate SUB2 in the display region AA. The light-shielding layer BM is made of black resin material.

If, unlike the first embodiment, the counter substrate SUB2 is provided with the color filter and the light-shielding layer positioned at the boundary between the colors of the color filters, the opening of the pixel Pix on the array substrate is more likely to overlap the position of the light-shielding layer in the display region AA of the counter substrate SUB2 as the pixel Pix is smaller. By contrast, in the COA structure according to the first embodiment illustrated in FIGS. 8 and 9, the display region AA of the counter substrate SUB2 is not provided with the color filter CF and the light-shielding layer positioned at the boundary between the colors of the color filters CF. Therefore, light passing through the opening of the pixel Pix is not blocked even if the pixel Pix is small.

Figure 10:
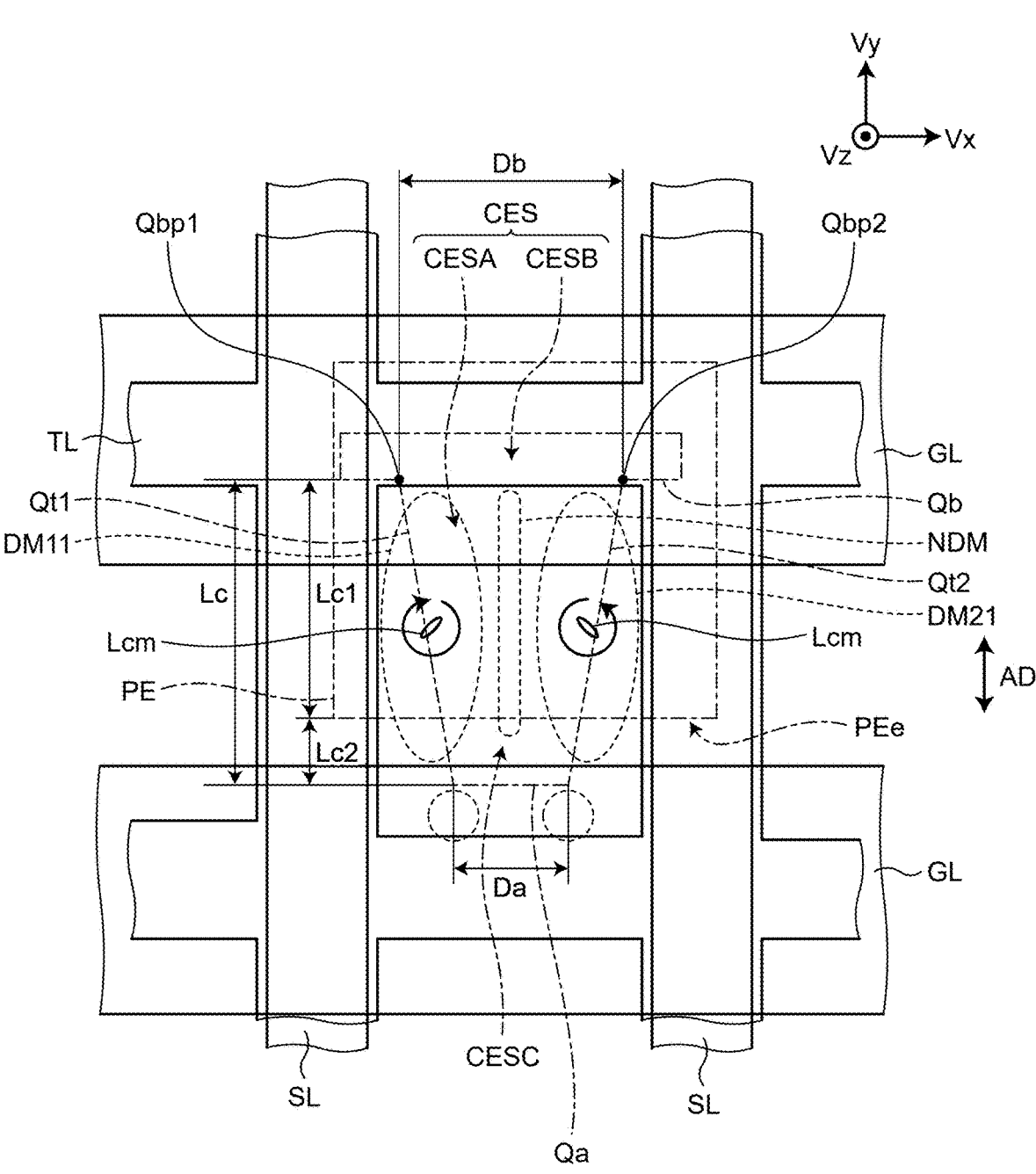
FIG. 10 is a plan view schematically illustrating the relation between a slit and liquid crystal domains according to the first embodiment.

FIG. 10 is a plan view schematically illustrating the relation between a slit and liquid crystal domains. As illustrated in FIGS. 6 and 10, the slit CES has a polygonal shape including a trapezoidal region CESA and a rectangular region CESB. The trapezoidal region CESA has a first side Qa, a second side Qb, a third side Qt1, and a fourth side Qt2. The first side Qa and the second side Qb face each other and are parallel. The third side Qt1 and the fourth side Qt2 face each other and are non-parallel. The distance between the third side Qt1 and the fourth side Qt2 decreases toward the first side Qa. The second side Qb constitutes one side of the rectangular region CESB, and the third side Qt1 and the fourth side Qt2 intersect the second side Qb at an intersection Qbp1 and an intersection Qbp2, respectively. The line connecting the intersection Qbp1 and the intersection Qbp2 is the second side of the trapezoidal region CESA, and the distance Db of the second side is larger than the length Da of the first side Qa. Thus, the slit CES includes a trapezoidal part in the opening of the pixel Pix.

The first side Qa overlaps the scanning line GL. The overlapping position of the first side Qa with the scanning line GL is preferably within a range of 0 μm to 0.3 μm from the end of the scanning line GL to reduce the effects of an electric field leaking from the scanning line GL. The first side Qa does not overlap the conductive layer TL and is less likely to be affected by the contact hole CH3.

The length of the third side Qt1 is equal to that of the fourth side Qt2. Thus, the trapezoidal region CESA has an isosceles trapezoidal shape. The distance Db of the second side Qb is approximately 2 μm to 3 μm. The length Da of the first side Qa is equal to or smaller than 2 μm. If the length Da of the first side Qa is substantially 0, and the third side Qt1 and the fourth side Qt2 intersect, the trapezoidal region CESA has a triangular shape. The trapezoidal region CESA simply needs to have a polygonal shape having three or more corners and may be pentagonal, hexagonal, octagonal, or other polygonal shapes. The trapezoidal region CESA may have an asymmetric trapezoidal shape where the length of the third side Qt1 is different from that of the fourth side Qt2.

A distance Lc from the first side Qa to the second side Qb is larger than the distance of the opening formed between the scanning lines GL in the direction Vy. The distance Db of the second side Qb is smaller than the distance of the opening formed between the conductive layers TL in the direction Vx. A distance Lc1 from an end PEe of the pixel electrode PE to the second side Qb is smaller than the distance Lc. A region CESC between the end PEe of the pixel electrode PE and the scanning line GL has a length in the direction Vy smaller than a distance Lc2 from the end PEe of the pixel electrode PE to the first side Qa.

As described above, the slit CES of the common electrode CE has the first side Qa, the second side Qb, the third side Qt1, and the fourth side Qt2. In plan view, the first side Qa overlaps the scanning line GL, and the distance between the third side Qt1 and the fourth side Qt2 decreases toward the first side Qa. When the distance between the third side Qt1 and the fourth side Qt2 decreases toward the first side Qa, the stability of liquid crystal orientation near the third side Qt1 and the fourth side Qt2 is better than in a case where the third side Qt1 and the fourth side Qt2 are parallel. As a result, the behavior of liquid crystal molecules Lcm is stabilized.

For example, when no voltage is applied to the liquid crystal layer LC, the liquid crystal molecules Lcm are initially oriented with their long axes parallel to the initial orientation direction AD on the third side Qt1 and the fourth side Qt2 of the slit CES. The liquid crystal molecules Lcm in the respective regions near the third side Qt1 and the fourth side Qt2 adjacent to each other are inclined in opposite directions with respect to the direction Vy. By contrast, when voltage is applied to the liquid crystal layer LC, that is, in an ON state where an electric field is formed between the pixel electrode PE and the common electrode CE, the liquid crystal molecules Lcm are affected by the electric field, and their orientation state changes.

In the display device according to the first embodiment, a dark region NDM where the orientation of the liquid crystal molecules Lcm hardly changes is formed at the intermediate position between the third side Qt1 and the fourth side Qt2. While the dark region NDM is also formed near the first side Qa, the presence of the dark region NDM is made invisible by the scanning line GL.

As illustrated in FIG. 10, liquid crystal domains DM11 and DM21 are generated on the third side Qt1 and the fourth side Qt2. In the liquid crystal domains DM11 and DM21, the liquid crystal molecules Lcm near the third side Qt1 and the fourth side Qt2 rotate in opposite directions when voltage is applied between the pixel electrode PE and the common electrode CE.

Thus, when voltage is applied between the pixel electrode PE and the common electrode CE, the long axis direction of the liquid crystal molecules Lcm rotates clockwise in the region near the third side Qt1 and counterclockwise in the region near the fourth side Qt2. Also near the region CESC, when voltage is applied between the pixel electrode PE and the common electrode CE, the long axis direction of the liquid crystal molecules Lcm rotates clockwise in the region near the third side Qt1 and counterclockwise in the region near the fourth side Qt2. Thus, when voltage is applied between the pixel electrode PE and the common electrode CE, the polarization state of incident linearly polarized light changes depending on the orientation state of the liquid crystal molecules Lcm as the linearly polarized light passes through the liquid crystal layer LC.

The liquid crystal molecules Lcm in the liquid crystal domains DM11 and DM12 respond faster than those in liquid crystal display devices of a lateral electric field mode, such as fringe field switching (FFS) mode and in-plane switching (IPS) mode.

The rectangular region CESB stabilizes the liquid crystal domains DM11 and DM21. In the display device according to the first embodiment, if the pixel Pix becomes smaller for higher definition, the area ratio of the liquid crystal domains DM11 and DM21 in the pixel Pix increases, and the transmittance is improved.

As illustrated in FIG. 6, if the pixel Pix becomes smaller for higher resolution, it is necessary to prevent a short circuit between two adjacent pixels Pix due to the contact hole CH3 of the adjacent pixel Pix. To prevent a short circuit between two adjacent pixels Pix, it is necessary to make the end PEe of the pixel electrode PE away from the contact hole CH3 of the adjacent pixel Pix. For example, the distance in the direction Vy from the end PEe of the pixel electrode PE to the conductive layer TL is 2 μm or larger. Therefore, the end PEe of the pixel electrode PE crosses the light-transmitting region of the opening of the pixel Pix.

Figure 11:
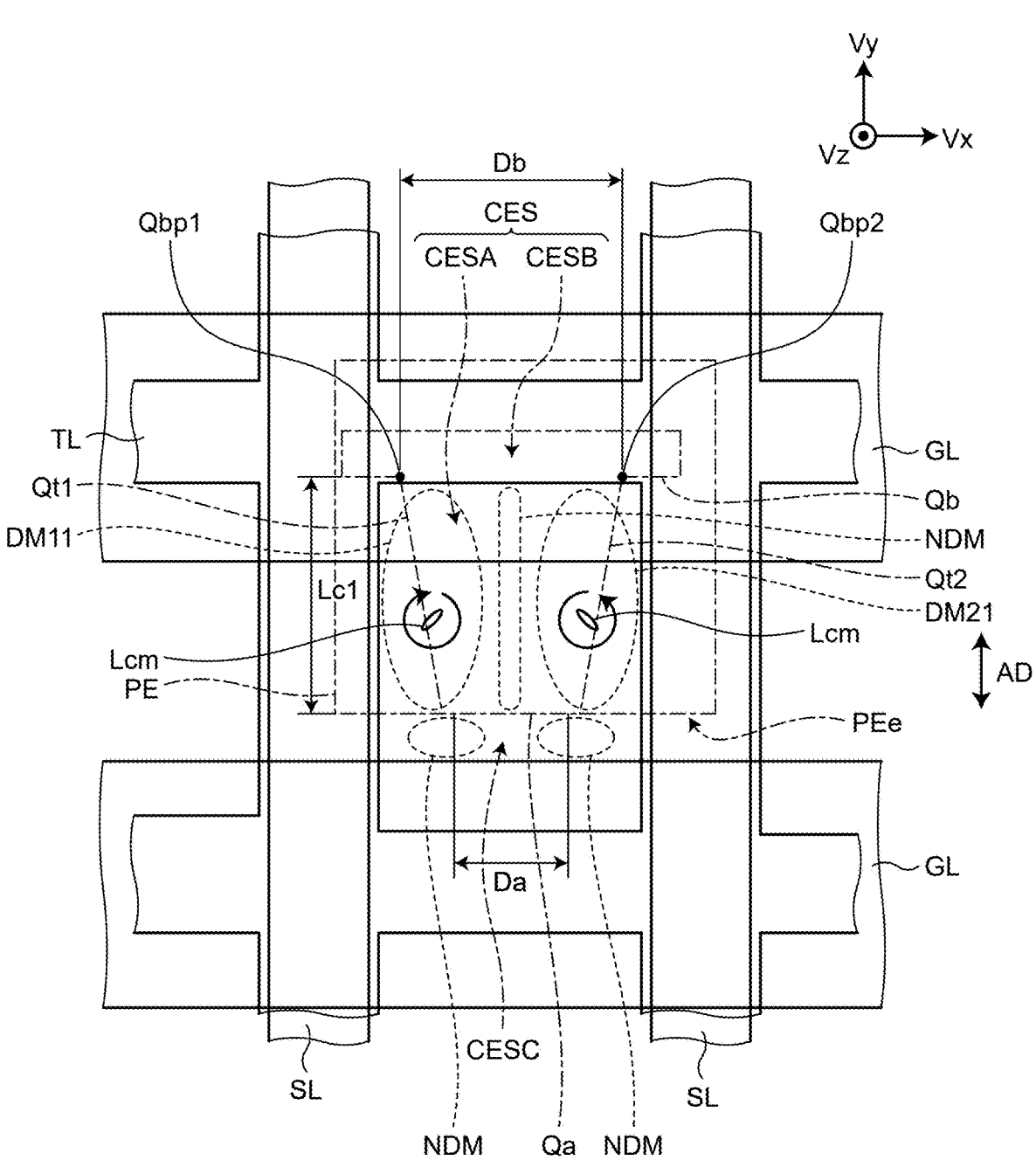
FIG. 11 is a plan view schematically illustrating the relation between the slit and the liquid crystal domains according to a comparative example.

FIG. 11 is a plan view schematically illustrating the relation between the slit and the liquid crystal domains according to a comparative example. As illustrated in the comparative example in FIG. 11, if the end PEe of the pixel electrode PE and the first side Qa of the slit CES are at the same position in plan view, the dark regions NDM are generated in the region CESC between the end PEe of the pixel electrode PE and the scanning line GL, and the luminance of the pixel Pix may possibly be reduced. By contrast, the end PEe of the pixel electrode PE and the first side Qa of the slit CES according to the first embodiment are at different positions in plan view. As illustrated in FIG. 7, the end PEe of the pixel electrode PE overlaps the slit CEA of the common electrode CE. While the region CESC is not provided with the conductive material of the common electrode CE and the pixel electrode PE, the liquid crystal domains DM11 and DM21 appear also in the region CESC due to a fringe electric field. As a result, the display device 100 according to the first embodiment can increase the normalized liquid crystal mode efficiency by 1.37 times compared with that of the comparative example described above and can improve the maximum luminance of the pixel Pix.

The display region AA of the counter substrate SUB2 is provided with no light-shielding layer. This configuration reduces the effects of overlapping misalignment between the array substrate SUB1 and the counter substrate SUB2.

As described above, the display device 100 according to the first embodiment includes the array substrate SUB1, the counter substrate SUB2 facing the array substrate SUB1, and the liquid crystal layer LC including the liquid crystal molecules Lcm between the array substrate SUB1 and the counter substrate SUB2. The array substrate SUB1 includes a plurality of signal lines SL, a plurality of scanning lines GL, a plurality of pixel electrodes PE, a plurality of semiconductors SC, and a common electrode CE. The signal lines SL are arrayed in the direction Vx so as to be spaced apart from each other. The scanning lines GL are arrayed in the direction Vy so as to be spaced apart from each other. The pixel electrodes PE are each disposed in the opening of the pixel Pix surrounded by two adjacent signal lines SL and two adjacent scanning lines GL. The semiconductors SC are each provided to the pixel Pix. The common electrode CE overlaps the pixel electrodes PE with the seventh insulating film 17 interposed therebetween.

The end PEe of the pixel electrode PE overlaps the opening of the pixel Pix. With this configuration, the opening of the pixel Pix has two parts: one provided with the pixel electrode PE and the other not provided with the pixel electrode PE illustrated in FIG. 10. As illustrated in FIG. 10, when the distance Lc1 from the second side Qb to the end PEe of the pixel electrode PE is larger than the distance Lc2 from the first side Qa to the end PEe of the pixel electrode PE, the light transmittance is further improved. The slit CES of the common electrode CE has a polygonal shape. In the opening of the pixel Pix, one part of the slit CES of the common electrode CE overlaps the pixel electrode PE, and the region CESC serving as the other part of the slit CES of the common electrode CE overlaps the region not provided with the pixel electrode. This configuration can reduce occurrence of a short circuit between adjacent pixel electrodes PE even if the pixels Pix are made finer for higher definition. Even if the pixel Pix is finer for higher definition, the light transmittance is improved because the liquid crystal domains DM11 and DM21 appear near the region CESC.

Modification of the First Embodiment

Figure 12:
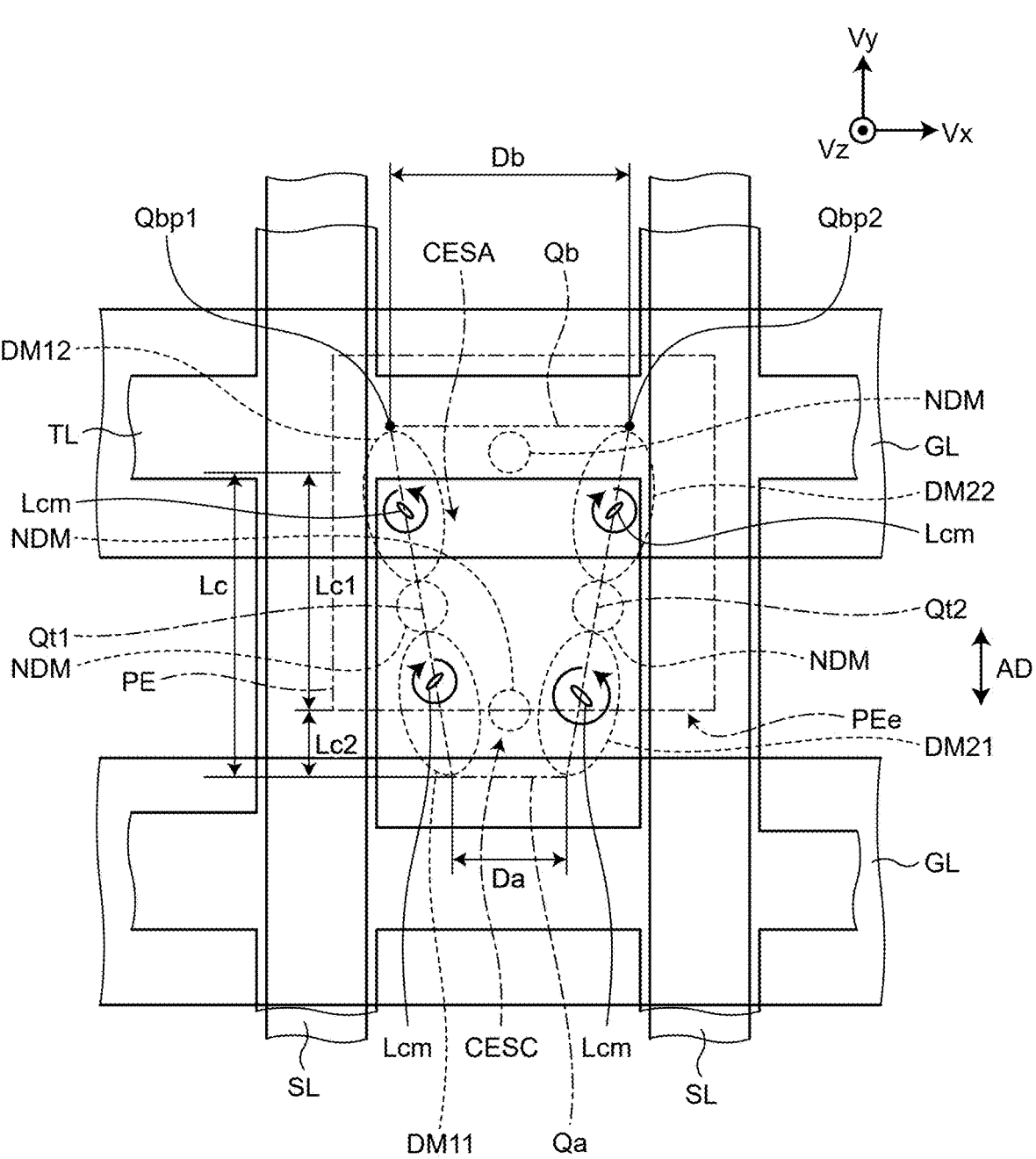
FIG. 12 is a plan view schematically illustrating the relation between the slit and the liquid crystal domains according to a modification of the first embodiment.

FIG. 12 is a plan view schematically illustrating the relation between the slit and the liquid crystal domains according to a modification of the first embodiment. In the following description, components similar to those according to the first embodiment may be denoted by the same reference numerals. Duplicate explanation thereof is omitted. The modification of the first embodiment is different from the first embodiment in that the slit CES has a trapezoidal shape and does not include the rectangular region CESB.

As illustrated in FIG. 12, the slit CES has a polygonal shape including the trapezoidal region CESA. The trapezoidal region CESA has a first side Qa, a second side Qb, a third side Qt1, and a fourth side Qt2. The first side Qa and the second side Ob face each other and are parallel. The third side Qt1 and the fourth side Qt2 face each other and are non-parallel. The distance between the third side Qt1 and the fourth side Qt2 decreases toward the first side Qa. The second side Qb constitutes one side of the rectangular region CESB, and the third side Qt1 and the fourth side Qt2 intersect the second side Qb at an intersection Qbp1 and an intersection Qbp2, respectively. The line connecting the intersection Qbp1 and the intersection Qbp2 is the second side of the trapezoidal region CESA, and the distance Db of the second side is larger than the length Da of the first side Qa. Thus, the slit CES includes a trapezoidal part in the opening of the pixel Pix.

As illustrated in FIG. 12, liquid crystal domains DM11, DM12, DM21, and DM22 are generated between the dark regions NDM. In the liquid crystal domains DM11 and DM21, the liquid crystal molecules Lcm near the third side Qt1 and the fourth side Qt2 rotate in opposite directions when voltage is applied between the pixel electrode PE and the common electrode CE. In the liquid crystal domains DM12 and DM22, the liquid crystal molecules Lcm near the third side Qt1 and the fourth side Qt2 rotate in opposite directions when voltage is applied between the pixel electrode PE and the common electrode CE.

In the display device according to the modification of the first embodiment, the dark regions NDM where the orientation of the liquid crystal molecules Lcm hardly changes are formed at the respective centers of the third side Qt1 and the fourth side Qt2.

The liquid crystal domains DM11 and DM12 sandwich the dark region NDM. In the liquid crystal domains DM11 and DM12, the liquid crystal molecules Lcm near the third side Qt1 rotate in opposite directions when voltage is applied between the pixel electrode PE and the common electrode CE. The liquid crystal domains DM21 and DM22 sandwich the dark region NDM. In the liquid crystal domains DM21 and DM22, the liquid crystal molecules Lcm near the fourth side Qt2 rotate in opposite directions when voltage is applied between the pixel electrode PE and the common electrode CE.

While the region CESC is not provided with the conductive material of the common electrode CE and the pixel electrode PE, the liquid crystal domains DM11 and DM21 appear due to a fringe electric field. Therefore, the light transmittance is improved in the display device 100 according to the modification of the first embodiment.

It is considered that the rotation directions in the liquid crystal domains DM11 and DM12 according to the modification of the first embodiment are aligned in the liquid crystal domain DM11 according to the first embodiment. Therefore, the liquid crystal domain DM11 according to the first embodiment has a larger area ratio in the pixel Pix than in the modification of the first embodiment. Similarly, it is considered that the rotation directions in the liquid crystal domains DM21 and DM22 according to the modification of the first embodiment are aligned in the liquid crystal domain DM21 according to the first embodiment. Therefore, the liquid crystal domain DM21 according to the first embodiment has a larger area ratio in the pixel Pix than in the modification of the first embodiment.

Second Embodiment

Figure 13:
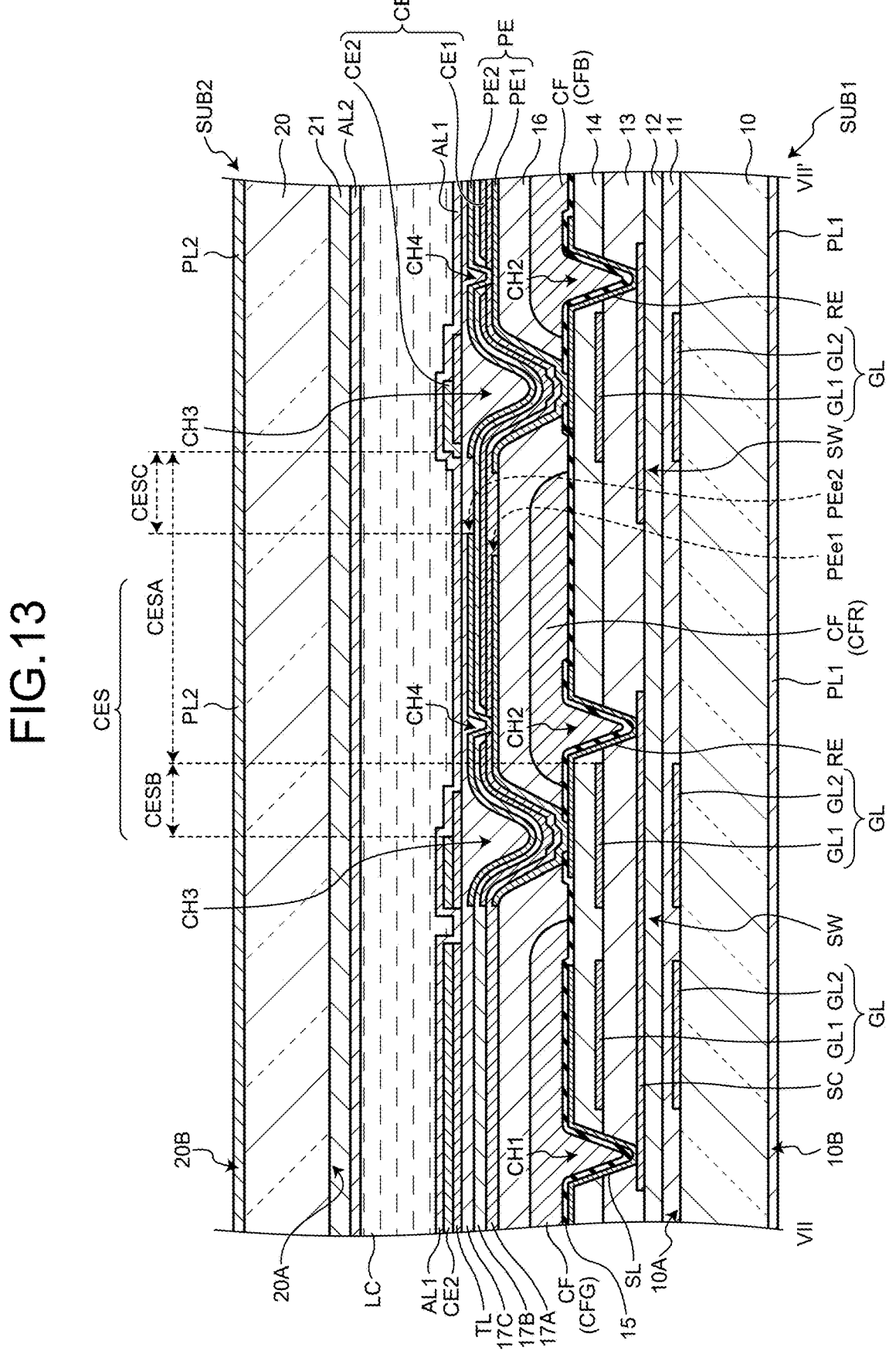
FIG. 13 is a sectional view schematically illustrating the section along line VII-VII' of FIG. 6 according to a second embodiment.
Figure 14:
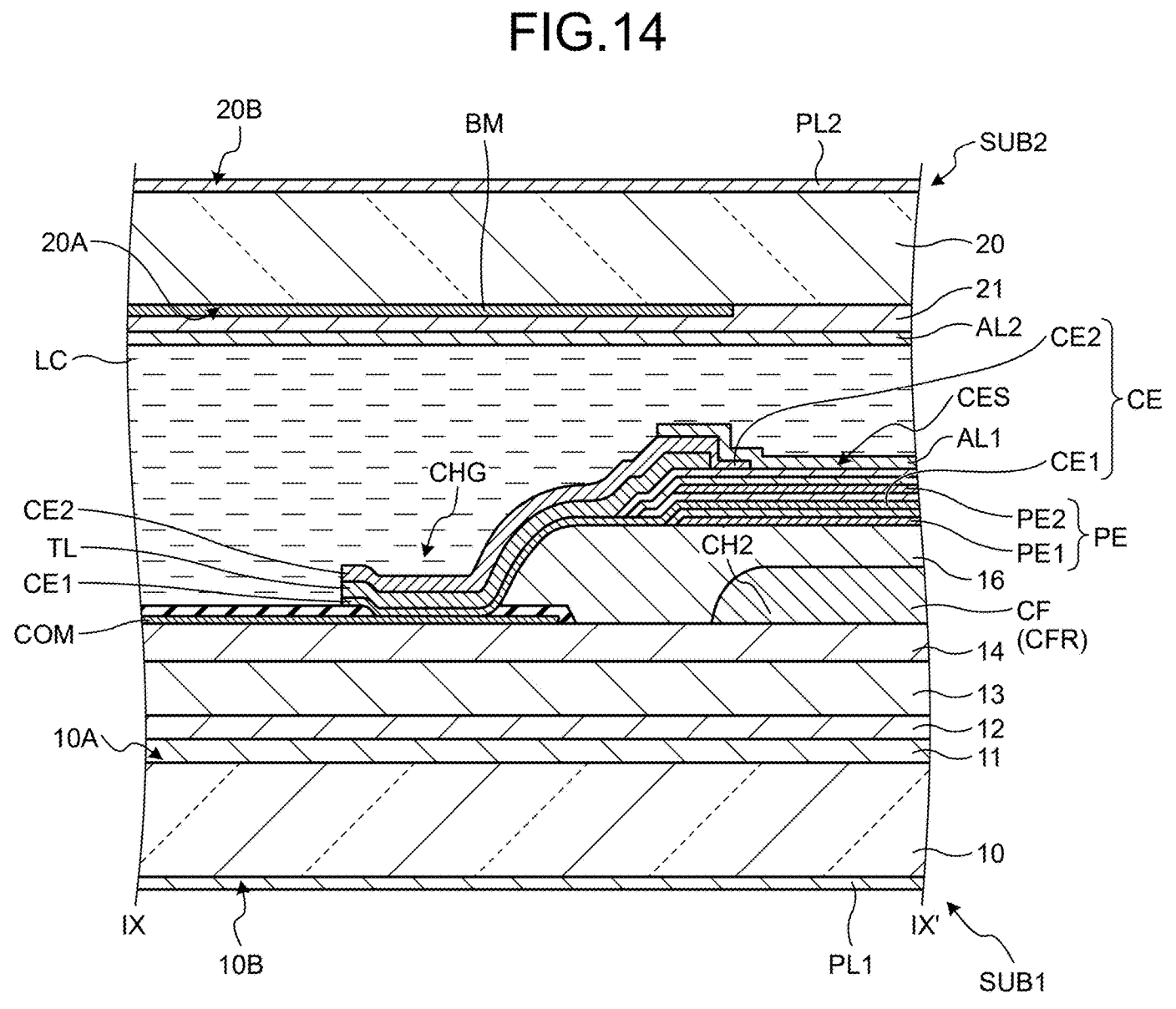

FIG. 13 is a sectional view schematically illustrating the section along line VII-VII' of FIG. 6 according to a second embodiment. FIG. 14 is a sectional view schematically illustrating the section along line IX-IX' of FIG. 8 according to the second embodiment. In the following description, components similar to those according to the first embodiment may be denoted by the same reference numerals. Duplicate explanation thereof is omitted. The second embodiment is different from the first embodiment in that the common electrode CE is composed of a plurality of layers and the pixel electrode is composed of a plurality of layers.

As illustrated in FIG. 13, the array substrate SUB1 is formed using a first insulating substrate 10 with a light-transmitting property, such as a glass or resin substrate, as a base. The array substrate SUB1 includes the first layer GL1 and the second layer GL2 of the scanning line GL, the first insulating film 11, the second insulating film 12, the third insulating film 13, the fourth insulating film 14, the color filter CF, the fifth insulating film 15, a pixel electrode PE1, the sixth insulating film 16, a shield electrode CE1, a first intermediate insulating film 17A, a second intermediate insulating film 17B, a third intermediate insulating film 17C, a pixel electrode PE2, the conductive layer TL, a common electrode CE2, the first orientation film AL1, and other components on the surface of the first insulating substrate 10 facing the counter substrate SUB2. In the following description, the direction from the array substrate SUB1 toward the counter substrate SUB2 is referred to as an upper side or simply as above.

The second layer GL2 of the scanning line GL is positioned on the first insulating substrate 10. The first insulating film 11 is positioned on the second layer GL2 of the scanning line GL and an inner surface 10A of the first insulating substrate 10. The second insulating film 12 is positioned on the first insulating film 11. The semiconductor SC is positioned on the second insulating film 12. The third insulating film 13 is positioned on the semiconductor SC and the second insulating film 12. The first layer GL1 of the scanning line GL is positioned on the third insulating film 13. The part of the first layer GL1 and the second layer GL2 of the scanning line GL overlapping the semiconductor SC functions as a gate electrode.

The fourth insulating film 14 is positioned on the first layer GL1 of the scanning line GL and the third insulating film 13. A hole is formed in the third insulating film 13 and the fourth insulating film 14 at a position overlapping the semiconductor SC to form the contact hole CH1. The signal line SL formed on the fourth insulating film 14 is electrically coupled to the semiconductor SC through the contact holes CH1.

A hole is formed in the third insulating film 13 and the fourth insulating film 14 at a position overlapping the semiconductor SC to form the contact hole CH2. The relay electrode RE formed on the fourth insulating film 14 is electrically coupled to the semiconductor SC through the contact holes CH2.

The fifth insulating film 15 is positioned on the signal line SL, the relay electrode RE, and the fourth insulating film 14. The color filter CF is positioned on the fifth insulating film 15. The sixth insulating film 16 is positioned on the color filter CF and the fifth insulating film 15.

A hole is formed in the fifth insulating film 15 and the sixth insulating film 16 at a position overlapping the relay electrode RE to form the contact hole CH3. The pixel electrode PE1 is electrically coupled to the relay electrode RE through the contact hole CH3. A first intermediate insulating film 17A is positioned on the sixth insulating film 16 and the pixel electrode PE1. The pixel electrode PE1 is made of light-transmitting conductive material, such as indium tin oxide (ITO), indium zinc oxide (IZO), and indium gallium oxide (IGO).

The shield electrode CE1 is positioned on the first intermediate insulating film 17A. The shield electrode CE1 is made of light-transmitting conductive material, such as ITO, IZO, and IGO. The second intermediate insulating film 17B is positioned on the shield electrode CE1 and the first intermediate insulating film 17A. The pixel electrode PE2 is positioned on the second intermediate insulating film 17B. The pixel electrode PE2 is made of light-transmitting conductive material, such as ITO, IZO, and IGO. A contact hole CH4 is formed in the second intermediate insulating film 17B. The pixel electrode PE2 is electrically insulated from the shield electrode CE1 by the second intermediate insulating film 17B, and the pixel electrode PE2 is electrically coupled to the pixel electrode PE1 through the contact hole CH4.

A third intermediate insulating film 17C is positioned on the pixel electrode PE2 and the second intermediate insulating film 17B. The first intermediate insulating film 17A, the second intermediate insulating film 17B, and the third intermediate insulating film 17C constitute the seventh insulating film.

The conductive layer TL is positioned on the third intermediate insulating film 17C. The conductive layer TL is a conductor and is electrically coupled to the common electrode CE. Therefore, the resistance per unit area of the common electrode CE and the conductive layer TL is small. The conductive layer TL may be a single layer of metal, such as aluminum (Al). Alternatively, the conductive later TL may be composed of a plurality of metal layers, such as titanium/aluminum/titanium and molybdenum/aluminum/molybdenum, by disposing titanium (Ti) and molybdenum (Mo) on and under aluminum.

The common electrode CE2 is positioned on the conductive layer TL and the third intermediate insulating film 17C. The common electrode CE2 and the slit CES are covered by the first orientation film AL1.

The counter substrate SUB2 is formed using a second insulating substrate 20 as a base. The second insulating substrate 20 is a light-transmitting substrate, such as a glass or resin substrate. The counter substrate SUB2 includes an overcoat layer 21 and a second orientation film AL2 on the surface of the second insulating substrate 20 facing the array substrate SUB1.

As illustrated in FIGS. 8 and 14, wiring COM for supplying a common potential is disposed on the fourth insulating film 14 in the peripheral region GA. The fifth insulating film 15 covers and protects the wiring COM. A contact hole CHG is formed in part of the fifth insulating film 15, and the wiring COM is electrically coupled to the shield electrode CE1, the conductive layer TL, and the common electrode CE2 extended from the display region AA through the contact hole CHG. As a result, the shield electrode CE1 has the same potential as the common electrode CE2 does. The shield electrode CE1 also functions as the common electrode CE together with the common electrode CE2.

As illustrated in FIG. 13, an end PEe1 of the pixel electrode PE1 overlaps the shield electrode CE1. An end PEe2 of the pixel electrode PE2 overlaps the shield electrode CE1. The shield electrode CE1 overlaps the region CESC. This configuration suppresses capacitive coupling between the pixel electrodes PE2 of adjacent pixels Pix. Similarly to the first embodiment, the end PEe2 of the pixel electrode PE2 overlaps the slit CEA of the common electrode CE2.

As illustrated in FIG. 13, the common electrode CE2 overlapping the pixel electrodes PE2 with the third intermediate insulating film 17C interposed therebetween is provided. The end PEe2 of the pixel electrode PE2 according to the second embodiment also overlaps the opening of the pixel Pix. With this configuration, the opening of the pixel Pix has two parts: one provided with the pixel electrode PE2 and the other not provided with the pixel electrode PE2. The slit CES of the common electrode CE2 has a polygonal shape. In the opening of the pixel Pix, one part of the slit CES of the common electrode CE2 overlaps the pixel electrode PE2, and the region CESC serving as the other part of the slit CES of the common electrode CE2 overlaps the region not provided with the pixel electrode. This configuration can reduce occurrence of a short circuit between adjacent pixel electrodes PE2 even if the pixels Pix are made finer for higher definition. Even if the pixel Pix is finer for higher definition, the light transmittance is improved because the liquid crystal domains DM11 and DM21 appear near the region CESC similarly to the first embodiment.

While the exemplary embodiments have been described, the embodiments are not intended to limit the present disclosure. The contents disclosed in the embodiments are given by way of example only, and various modifications may be made without departing from the spirit of the present disclosure. Appropriate modifications made without departing from the spirit of the present disclosure naturally fall within the technical scope of the present disclosure.

What is claimed is:

1. A display device comprising:
an array substrate;
a counter substrate facing the array substrate; and
a liquid crystal layer including liquid crystal molecules between the array substrate and the counter substrate, wherein
the array substrate comprises:
a plurality of signal lines arrayed in a first direction so as to be spaced apart from each other;
a scanning lines arrayed in a second direction so as to be spaced apart from each other;
a plurality of pixel electrodes disposed respectively in openings of pixels each of which is surrounded by two adjacent signal lines and two adjacent scanning lines;
a plurality of semiconductors provided respectively to the pixels; and
a common electrode overlapping the pixel electrodes with an insulating film interposed between the common electrode and the pixel electrodes,
an end of each of the pixel electrodes overlaps the opening of a corresponding one of the pixels,
a slit of the common electrode includes a trapezoidal shape,
the slit of the common electrode includes a first side, a second side, a third side, and a fourth side,
the first side overlaps one of the scanning lines in plan view,
a distance between the third side and the fourth side decreases toward the first side,
the first side, the third side, and the fourth side constitute part of the trapezoidal shape, and in the opening of each of the pixels:
a first side of the slit of the common electrode overlaps an area that the pixel electrode is not disposed;
the third side and the fourth side include:
a first portion that overlaps the pixel electrode; and
a second portion that is other than the first portion and that overlaps a region not provided with the pixel electrode.

2. The display device according to claim 1, wherein, when voltage is applied between each of the pixel electrodes and the common electrode, a long axis direction of the liquid crystal molecules rotates clockwise in a region near the third side and rotates counterclockwise in a region near the fourth side.

3. The display device according to claim 1, wherein, when voltage is applied between each of the pixel electrodes and the common electrode, a long axis direction of the liquid crystal molecule rotates clockwise in a region near the third side and rotates counterclockwise in a region near the fourth side in the second portion of the slit of the common electrode.

4. The display device according to claim 1, further comprising a shield electrode having the same potential as a potential of the common electrode, wherein the shield electrode overlaps the region not provided with the pixel electrode in plan view.

5. A display system comprising:
a lens;
the display device according to claim 1; and a control device configured to output an image to the display device.

* * * * *